United States Patent
Cho et al.

(10) Patent No.: US 9,487,102 B2
(45) Date of Patent: Nov. 8, 2016

(54) CHARGING METHOD OF GREEN CAR

(71) Applicant: Hyundai Motor Company, Seoul (KR)

(72) Inventors: Jae Hoon Cho, Suwon-si (KR); Tae Hyuck Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 183 days.

(21) Appl. No.: 14/460,154

(22) Filed: Aug. 14, 2014

(65) Prior Publication Data

US 2015/0165924 A1   Jun. 18, 2015

(30) Foreign Application Priority Data

Dec. 18, 2013 (KR) .................. 10-2013-0157745

(51) Int. Cl.
*H02J 7/00* (2006.01)
*B60L 11/18* (2006.01)
*H02J 7/04* (2006.01)

(52) U.S. Cl.
CPC ......... *B60L 11/1838* (2013.01); *B60L 2260/58* (2013.01); *H02J 7/041* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC .......... H02J 5/005; H02J 17/00; H02J 7/025; H02J 7/0073; H02J 50/12; H02J 7/00; H02J 3/383; H02J 7/1461; H02J 7/0013; H02J 7/041; H02J 7/35; Y02T 10/7005; Y02T 90/14; Y02T 90/121; Y02T 90/128

USPC .................................................. 320/150–160
See application file for complete search history.

(56) References Cited

U.S. PATENT DOCUMENTS

2005/0151624 A1* 7/2005 Qualich ............. G05B 19/0428
340/5.72
2009/0021218 A1* 1/2009 Kelty .................... B60L 3/0092
320/137

FOREIGN PATENT DOCUMENTS

| JP | 2013-081324 A | 5/2013 |
|---|---|---|
| JP | 2013-158075 A | 8/2013 |
| KR | 10-2010-0079338 A | 7/2010 |
| KR | 10-2012-0133481 A | 12/2012 |
| KR | 10-2013-0049200 A | 5/2013 |
| KR | 10-2013-0102404 A | 9/2013 |

OTHER PUBLICATIONS

Korean Notice of Allowance issued on Jul. 20, 2015 issued in corresponding Korean Patent Application No. 10-2013-0157745.
Office Action issued in Korean Application No. 10-2013-0157745 dated Jan. 19, 2015.

* cited by examiner

*Primary Examiner* — Binh Tat
(74) *Attorney, Agent, or Firm* — McDermott Will & Emery LLP

(57) ABSTRACT

A charging method of a green car includes confirming a reference of a charging reservation time input to a controller. A wake-up time is set based on the reference confirmed in the step of confirming the reservation reference. A charging starts after a vehicle wakes up at the time of reaching the wake-up time set in the step of setting the wake-up time.

8 Claims, 1 Drawing Sheet

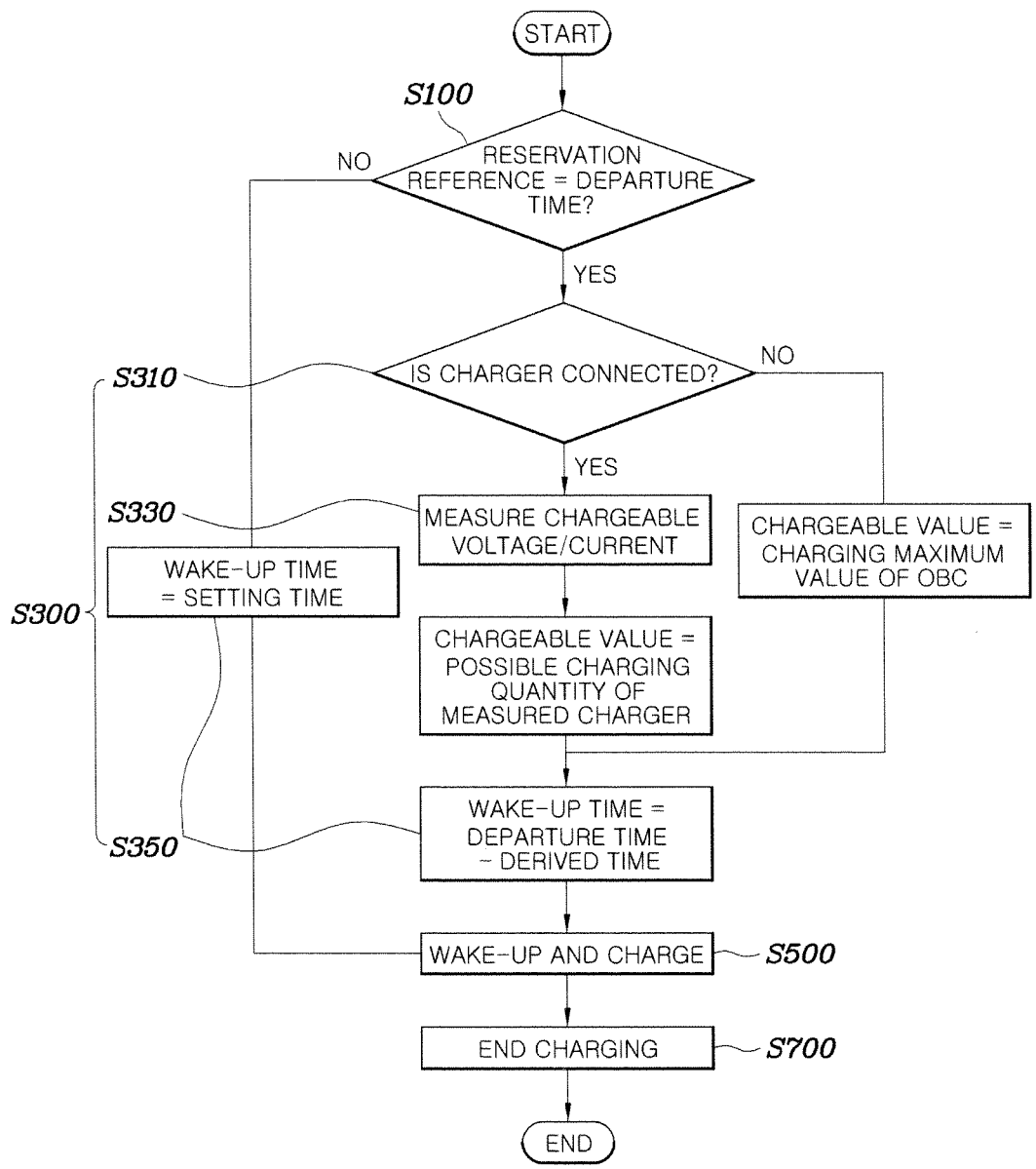

CHARGING METHOD OF GREEN CAR

CROSS REFERENCE TO RELATED APPLICATION

The present application claims the benefit of priority to Korean Patent Application Number 10-2013-0157745 filed on Dec. 18, 2013, the entire contents of which is incorporated herein for all purposes by this reference.

TECHNICAL FIELD

The present disclosure relates to a charging method of a green car capable of reserving and charging a high voltage battery.

BACKGROUND

Among green cars, an electric car and a plug-in hybrid car may be driven by charging a high voltage battery using a dedicated charger or a home outlet and converting electric energy charging the high voltage battery into mechanical energy.

The high voltage battery may be directly charged, but even in the state in which the high voltage battery is fully charged, the battery is gradually consumed due to a dark current, and the like, such that a reserved charging to previously reserve and charge the high voltage battery may be performed.

The reserved charging is a function of automatically charging a battery prior to a reference time to previously predict a use of the vehicle and drive the vehicle. When the reserved charging is set, the vehicle which is in a key off state wakes up by oneself to perform the charging.

In the case of the reserved charging, the vehicle wakes up at a specific time, in which a reference is divided into two cases, the case in which a start time is a reference and the case in which a departure time is a reference. In the case in which the start time is a reference, a user sets time so that the reserved charging starts at a specific time, and the vehicle wakes up at the set time, and thus, the battery starts to be automatically charged.

However, in the case which the departure time is the reference, when the user sets the departure time, the time when the battery is fully charged is calculated inversely, and thus, the vehicle wakes up at the corresponding time, such that the battery starts to be automatically charged.

Korean Patent Laid-Open Publication No. 10-2013-0049200A discloses a charging control apparatus for a vehicle including a battery which charges and discharges electricity, a battery heater which heats the battery, and a battery temperature detection means which detects a temperature of the battery. A battery control means monitors a temperature state of the battery to control a battery heater so as to heat the battery, and a charger supplies power to the battery and the battery heater. A timer charging reservation means enables a user to arbitrarily set a reference charging time and a targeted charging quantity, and a charging control means performs timer charging in the charging time set by the timer charging reservation means. The charging control means delays a charging stop time of the charging time when the battery is heated during the timer charging.

However, according to the foregoing disclosure, by controlling the temperature of the battery, the charging prediction time may be determined depending on the state of the high voltage battery at the time of the reservation charging, but since the state of the charger is not considered, an error in the charging time may occur depending on chargeable power of the charger.

The matters described as the related art have been provided only for assisting in the understanding for the background of the present disclosure and should not be considered as corresponding to the related art known to those skilled in the art.

SUMMARY

The present disclosure provides a charging method of a green car capable of reducing an error in charging time by a charging prediction time depending on a state of a high voltage battery at the time of prediction charging and calculating a charging prediction time in consideration of a state of a charger.

According to an exemplary embodiment of the present disclosure, a charging method of a green car includes confirming a reference of a charging reservation time input to a controller. A wake-up time is set based on the reference confirmed in the confirming of the reservation reference. A charging starts after a vehicle wakes up at the time of reaching the wake-up time set in the step of setting the wake-up time.

In the step of confirming the reservation reference, it may be confirmed whether a charging reservation time is a reference of a departure time or a reference of a start time.

In the step of setting the wake-up time, when the charging reservation time confirmed in the step of confirming the reservation reference is the reference of the start time, the wake-up time may be set to wake-up the vehicle to meet the start time.

The charging method of a green car may further include if it is determined in the step of setting the wake-up time that the charging reservation time confirmed in the step of confirming the reservation reference is the reference of the departure time, confirming whether a charger is connected.

The charging method of a green car may further include if it is confirmed in the step of confirming whether the charger is connected that the charger is not connected, determining the wake-up time by deriving a charging completion prediction time based on a charging maximum value of an on board charge (OBC).

The charging method of a green car may further include if it is confirmed in the step of confirming whether the charger is connected that the charger is connected, measuring the charger based on various information input from the connected charger to the controller.

In the step of measuring the charger, the step of determining the wake-up time may be performed by deriving a charging completion prediction time by measuring a voltage value of the charger.

In the step of measuring the charger, the step of determining the wake-up time may be performed by deriving a charging completion prediction time by measuring a current value of the charger.

In the step of measuring the charger, the step of determining the wake-up time may be performed by deriving a charging completion prediction time by measuring a voltage value and a current value of the charger.

The vehicle may wake-up in a time when the derived time is subtracted from the departure time set in the step of setting the wake-up time.

The charging method of a green car may further include ending the charging when the charging is completed.

BRIEF DESCRIPTION OF THE DRAWINGS

The above and other objects, features and advantages of the present disclosure will be more clearly understood from the following detailed description taken in conjunction with the accompanying drawings.

FIG. 1 is a block diagram illustrating a charging method of a green car according to an exemplary embodiment of the present disclosure.

DETAILED DESCRIPTION

Hereinafter, a charging method of a green car according to an exemplary embodiment of the present disclosure will be described with reference to the accompanying drawings.

FIG. 1 is a block diagram illustrating a charging method of a green car according to an exemplary embodiment of the present disclosure. The charging method of a green car according to an exemplary embodiment of the present disclosure includes confirming a reference of a charging reservation time input to a controller (S100). A wake-up time is set based on the reference confirmed in the step of confirming the reservation reference (S100) (S300). A charging starts after a vehicle wakes up at the time of reaching the wake-up time set in the step of setting the wake-up (S300) (S500). Further, the step of setting the wake-up (S300) includes confirming a charger (S310). The charger (S330) is measured, and the wake-up time (S350) is determined, in which after the charging is completed by performing the charging (S500), ending the charging (S700) is performed to end the reservation charging.

First, a user connects a plug-in hybrid car or a plug-in electric car to the charger to meet the use prediction time, sets a time to start the charging, and selects the charging reservation time from one of a departure time and a start time. In this case, the controller confirms whether the input charging reservation time is the departure time or the start time (S100).

After the step of confirming the reservation reference (S100), the step of setting the wake-up time (S300) based on the reference confirmed in the step of confirming the reservation reference (S100) is performed. In the step of setting the wake-up time (S300), when the charging reservation time confirmed in the step of confirming the reservation reference (S100) is the reference of the start time, the step of determining the wake-up time (S350) to wake-up the vehicle to meet the start time is performed. In this case, the wake-up time is set to the start time or the wake-up time may be set to the time earlier than the start time by calculating the time to set warming up and the like. At the time of reaching the set wake-up time, the controller wakes-up the vehicle and starts the charging to perform the charging (S500), and when the charging is completed, the charging (S700) is ended.

If the step of setting the wake-up time (S300), the charging reservation time confirmed in the step of confirming the reservation reference (S100) is the reference of the departure time, it is confirmed whether the charger is connected (S310). However, if it is confirmed in the step of confirming whether the charger is connected (S310) that the charger is not connected for any reason, the step of determining the wake-up time (S350) is performed by deriving a charging completion prediction time based on a charging maximum value of an on board charge (OBC).

However, if it is confirmed in the step of confirming whether the charger is connected (S310) that the charger is connected, the step of measuring the charger (S330) based on various information input from the connected charger to the controller is performed. Generally, when the charger is connected to the vehicle, and a charging reservation is set, the charger does not attempt charging. However, in the case of the exemplary embodiment of the present disclosure, even though the reservation charging is set, when the charger is connected to the vehicle, the charging is attempted for a set period of time in the initial stage of the connection to determine chargeable capacity of the charger, thereby more clearly and specifically predicting a charging completion time.

Therefore, in the step of measuring the charger S330, when the vehicle is connected to the charger, the charging is attempted for the set period of time in the initial stage of the connection to measure a voltage value and a current value of the charger. The controller derives the charging completion prediction time for charging the high voltage battery by the OBC based on the measured value to perform the step of determining the wake-up time (S350).

In the step of determining the wake-up time (S350), the wake-up time to wake-up the vehicle at the time when the derived time is subtracted from the departure time set based on the derived charging completion prediction time. At the time of reaching the set wake-up time, the vehicle wakes up, and the charging starts to perform the charging (S500). When the charging is completed, the charging (S700) ends. Generally, a series of steps are performed in a battery management system (BMS) which is the controller.

According to the charging method of a green car, the vehicle wakes up and is charged at the derived time by accurately predicting and applying the charging prediction time and the wake-up time based on the information obtained from the charger connected to perform the reservation charging. Therefore, it is possible to improve the consumer satisfaction, the fuel efficiency, and the brand image by interrupting the insufficient charging which is caused by waking up later than the prediction time and a dark current which is consumed by waking up earlier than the prediction time.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A charging method of a green car, comprising steps of:
confirming a reference of a charging reservation time input to a controller;
setting a wake-up time based on the reference confirmed in the step of confirming the reservation reference; and
starting a charging after a vehicle wakes up at the time of reaching the wake-up time set in the step of setting the wake-up time
wherein the step of confirming includes confirming whether the reference of the charging reservation time is a reference of a departure time or a reference of a start time, and
wherein the step of setting includes:
confirming whether a charger is connected, if the reference of the charging reservation time is the reference of the departure time and determining a wake-up time by deriving a charging completion prediction time based on a charging maximum value of an on board charge (OBC), if the charger is not connected.

2. The charging method of claim 1, wherein in the step of setting the wake-up time, when the charging reservation time confirmed in the step of confirming the reservation reference is the reference of the start time, the wake-up time is set to wake-up the vehicle to meet the start time.

3. The charging method of claim 1, further comprising a step of: measuring the charger based on various information input from the connected charger to the controller if it is confirmed in the step of confirming whether the charger is connected that the charger is connected.

4. The charging method of claim 3, wherein in the step of measuring the charger, the step of determining the wake-up time is performed by deriving a charging completion prediction time by measuring a voltage value of the charger.

5. The charging method of claim 3, wherein in the step of measuring the charger, the step of determining the wake-up time is performed by deriving a charging completion prediction time by measuring a current value of the charger.

6. The charging method of claim 3, wherein in the step of measuring the charger, the step of determining the wake-up time is performed by deriving a charging completion prediction time by measuring a voltage value and a current value of the charger.

7. The charging method of claim 1, wherein the vehicle wakes up when the derived time is subtracted from the departure time set in the step of setting the wake-up time.

8. The charging method of claim 1, further comprising a step of: ending the charging when the charging is completed.

* * * * *